(No Model.)
C. GARLAND.
FOLDING STEP LADDER.
No. 600,281. Patented Mar. 8, 1898.
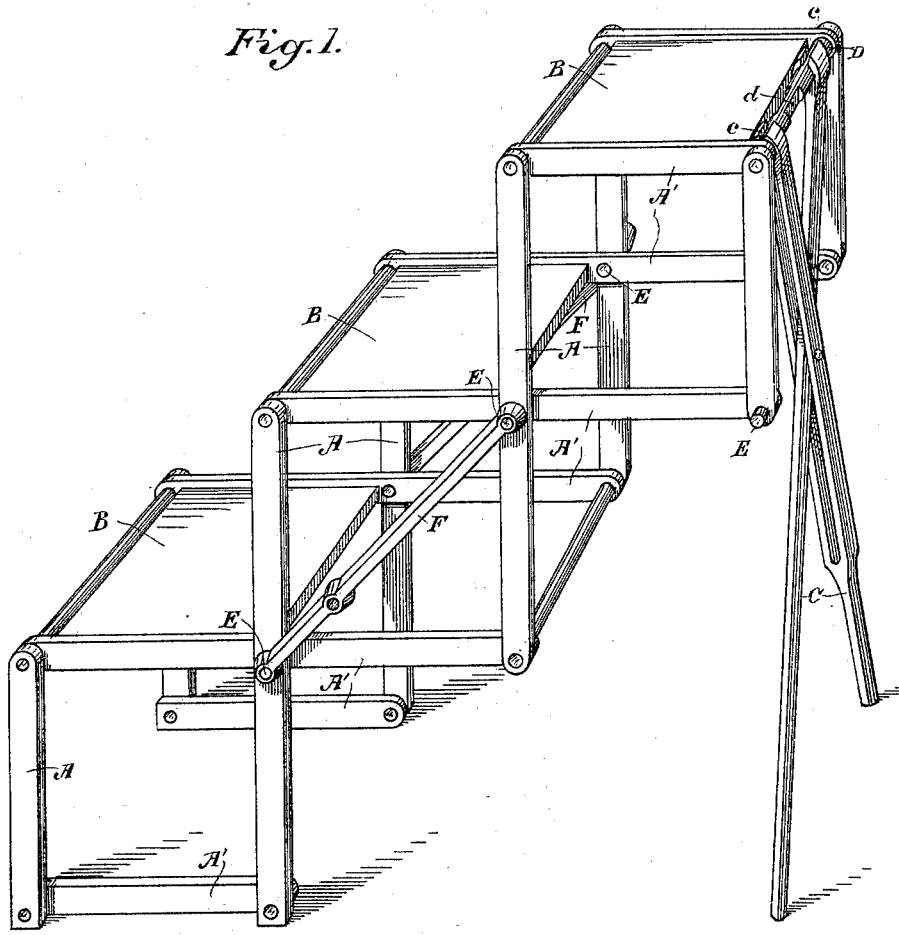
Fig. 1.
Fig. 2.
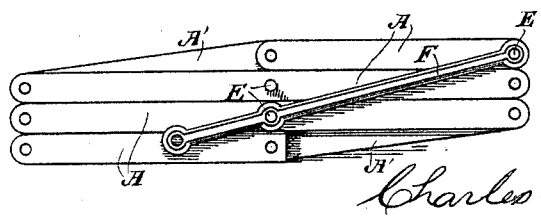
Witnesses,
Inventor,
Charles Garland
By Dewey & Co.
Attys

UNITED STATES PATENT OFFICE.

CHARLES GARLAND, OF GRAYSON, CALIFORNIA, ASSIGNOR OF ONE-HALF TO JAMES M. HAMMONDS, OF SAME PLACE.

FOLDING STEP-LADDER.

SPECIFICATION forming part of Letters Patent No. 600,281, dated March 8, 1898.

Application filed July 22, 1897. Serial No. 645,540. (No model.)

*To all whom it may concern:*

Be it known that I, CHARLES GARLAND, a citizen of the United States, residing at Grayson, county of Stanislaus, State of California, have invented an Improvement in Folding Step-Ladders; and I hereby declare the following to be a full, clear, and exact description of the same.

My invention relates to a step-ladder which may be suitably extended for use and is adapted to be folded up into small compass for storage when not in use.

It consists in the parts and the construction and combination of parts hereinafter described and claimed.

Figure 1 is a view of my step-ladder extended. Fig. 2 shows it folded.

A and A' are lever-arms, which cross each other in pairs and are pivoted together at their centers and ends, so that they may be opened and closed in the form of what is known as "lazy-tongs." Upon the projecting ends of the arms A', between the central and end pivot bars or pins at one side of the center, are fixed the steps B, extending between the lever-frames, which form the two sides and which are separated sufficiently to give the step-ladder any desired width. When the parts are closed together, as shown in Fig. 2, the lever-arms lie closely against each other, occupying but very small space. When extended by pulling them apart until the lever-arms A A' lie at right angles with each other, the lower ends of the lowermost arms stand vertically upon the ground and the outermost of the connecting-levers are cut off at the point which would form the center if the frame were to be extended farther. This leaves the two short arms at the bottom A' extending horizontally between the ends of the two levers A on that side and serving to rest upon soft ground when the ladder is to be used upon such a surface and thus prevent the ends of the arms from sinking into the ground. The steps will then be in an essentially horizontal position, and the rear end is supported by standards C, which cross each other near the center, as shown, and have holes bored through the upper ends to fit around connecting-bar D of the upper and outermost of the cross-levers A A'.

In order to easily apply the support, I have shown the central portion of the bar D flattened, as shown at *d*, and slots *c* are cut in the ends of the standards C to connect with the holes which will fit upon the bar D. These slots are narrower than the diameter of the bar except at the point where it is flattened, as shown, and when the bars C are closed together the slotted ends will slip over the flattened portion *d* until the bar lies in the round openings. The standards C can then be spread apart, slipping along the rounded part of the bar D until they are fully extended against the inner sides A' of the main bars of the framework. The lower ends of the standards C will rest upon the ground and thus hold the device with the steps in a proper position to be walked upon.

In order to prevent the device from closing or extending beyond the desired point, I have shown the central pivot-pins E projecting from two or more of the adjacent central pivot-points, and bars F have holes made in them, so as to fit over the ends of these pins, extending diagonally from center to center and thus acting as braces to prevent the sides from being further extended or closed. By this construction I am enabled to provide a convenient step-ladder, which is easily folded for storage or transportation.

The ladder is dismounted by first closing the standards C together until the slotted ends are in line with the flattened portions *d* of the top bar when they are withdrawn. The slide-bars F are then slipped off the pivot-pins and the device is closed up, so that the lever-arms lie closely together and occupy small space. If desired to fasten the device in this position, the bars F can be fitted to extend from one of the central pivot-pins E to pivot-pins fixed at the ends of one of the exterior pairs of levers, as shown in Fig. 2, and this prevents the device from being extended. The bars C occupying but small space the whole can be easily stored or transported.

Having thus described my invention, what I claim as new, and desire to secure by Letters Patent, is—

1. A step-ladder consisting of the centrally-pivoted side bars, the ends also pivoted together, steps fixed between each alternate pair of side bars between the center and the end, a means comprising removably-connected brace-bars and the projecting ends of the pivots of the frame-bars for limiting the extension of the frame, and standards pivoted together between their ends and having their upper ends provided with means to detachably engage the top bar of the ladder, said standards adapted to support the upper rear end of the ladder when extended.

2. A step-ladder consisting of crossed levers pivoted at the centers and ends, adapted to open and close about their central pivots, steps fixed between the side bars between the center and one end, a rounded bar having a flattened center extending across the upper rear end of the framework, standards centrally pivoted, adapted to open and close about the pivots, having holes at the upper end which will fit upon the outer ends of the transverse bar and slots of narrower diameter extending from the ends to said holes whereby when the brace-bars are closed together, these slots may be slipped over the flattened portion and the standards afterward separated so as to be locked upon the bar.

In witness whereof I have hereunto set my hand.

CHARLES GARLAND.

Witnesses:
T. C. BROWN,
A. A. SEARLE.